Patented Mar. 6, 1934

1,949,657

UNITED STATES PATENT OFFICE 1,949,657

FOOD COMPOSITION

Robert M. Preston, Chicago, Ill.

No Drawing. Application September 7, 1933,
Serial No. 688,435

8 Claims. (Cl. 99—11)

This invention relates to a food composition for use in the preparation of confectionery, cake, jellies, and the like. More particularly, this invention relates to the manufacture of a composition comprising a mixture of one or more sugars with pectin in the form of a white, creamy mass of a semi-solid or grease-like consistency.

It has heretofore been proposed to incorporate pectin into various types of confectionery, such as meringues, ice cream and so-called "candy doctor". The present invention, however, has for one of its objects to provide a composition prepared from a sugar base and pectin in such a manner and with the ingredients in such proportions as to provide a substantially permanently homogeneous preparation of a colloidal nature and of a creamy and grease-like consistency. A product of this type has particular utility as a fondant in the manufacture of confectionery and also as a pectin-sugar base in the manufacture of jellies and the like.

Numerous attempts have heretofore been made to provide an admixture of sugar and pectin in a convenient form for marketing and as a source of soluble pectin in the manufacture of jellies and the like. My present composition of sugar and pectin contains the pectin in such a form that it will readily go into solution without the necessity of using boiling temperatures and without any tendency to lump during the dissolving step.

It is therefore an object of my invention to provide a pectin preparation in which the pectin is held in solution by a concentrated sugar solution having numerous fine grains of sugar in suspension to give body to the mass and to stabilize the pectin.

It is therefore a further object of this invention to provide a food composition composed largely of a simple sugar, or monosaccharide, or a mixture of monosaccharides, such as invert sugar, and pectin, with the pectin in such condition as to be readily soluble when the composition is used in the manufacture of jellies and the like.

Other and further important objects of this invention will become apparent from the following description and appended claims.

I prefer to use, as the starting material in making my product, a syrup comprising a concentrated solution of a monosaccharide which is itself uncrystallizable or difficultly crystallizable. For example, a concentrated syrup may be used in which from 30 to 90% of the total sugar content is invert sugar, the rest being cane sugar, corn sugar or dextrose and this syrup will not crystallize until subjected to a very low temperature. Such a syrup will be operative for my purpose.

For purposes of illustration, my preferred procedure for the preparation of my product will now be described.

I may start with sucrose, cane sugar, and invert it in any suitable manner known to the art to obtain an invert sugar syrup or "mush", or I may start with a syrup of invert sugar, with corn syrup, or with any difficultly crystallizable sugar syrup such as are now available in the market. For my purposes, it is important that one of the ingredients of the final composition be a simple sugar in the form of a concentrated syrup that will not readily crystallize of itself. Concentrated solutions of invert sugar and commercial glucose, or corn syrup, are of this type.

The broad steps of my process include mixing an aqueous solution of pectin with a concentrated solution of a simple sugar, or monosaccharide, or other non-crystallizable sugar solution, at an elevated temperature, cooling the mass and seeding it with a solid sugar, such as solid invert sugar or dextrose to cause the mass to grain. The mass is continuously agitated during the graining step in order to aid in distributing the solid sugar throughout the mass and thus hastening the graining action. If solid invert sugar is used in the seeding operation, it is the dextrose content of the invert sugar and not the levulose content that effects the graining. Obviously, therefore, dextrose alone may be used either in a highly purified state or in any of its various solid, commercial forms.

The amount of sugar used for seeding may vary between 1% and 45% of the total sugar content of the syrup.

It will be understood that the seeding is for the purpose of causing a graining or crystallization of one or more of the sugar constituents in a very finely divided form. While the substance used for seeding is usually dextrose, it may be some other substance, as for example, where a syrup containing a large proportion of lactose is employed, solid lactose may be used as a seeding medium. Other known means for starting a uniform crystallization through a saturated or supersaturated solution may also be used.

The effect of seeding the mass of sugar and pectin is to convert the mass from a liquid form into a semi-solid condition, in which the pectin is uniformly distributed throughout the mass of sugar as a colloidal binder for the sugar particles.

Prompt cooling of the seeded mass to a relatively low temperature expedites the solidification of the mass and also aids in stabilizing the pectin in its uniformly distributed condition throughout the mass. Although it is possible to solidify the product at higher temperatures, sudden cooling to a relatively low temperature results in a much whiter product.

In starting with sucrose, I prefer to use the following method of converting the sucrose into invert sugar, although, as previously stated, various methods commonly known to the art can be satisfactorily used.

*Example*

520 pounds of cane sugar are dissolved in 147 pounds of water, to which 10.4 ounces of tartaric acid are then added and the mixture stirred until solution is complete. The mass is then heated to between 140 and 200° F. until the sucrose has been converted into invert sugar, namely, a mixture of dextrose and levulose. It is preferable to carry the conversion substantially to completeness, as may be determined by the usual tests.

The acidity of the resulting solution of invert sugar is partially or wholly neutralized by the addition of sodium bicarbonate or other suitable alkaline reacting material. Preferably, the syrup is left on the acid side, since pectin is more stable under slightly acid conditions than under alkaline conditions. I have found that a pH of about 5 is very satisfactory for an invert sugar syrup. The neutralization may best be carried out at a lower temperature than that employed for inverting the sugar, say at about 120° F. Using the quantities above specified of cane sugar and tartaric acid, about 7.8 ounces of sodium bicarbonate will usually be required. It will be understood that other acids may be used to invert the cane sugar and other alkaline substances for effecting partial neutralization of the invert sugar syrup.

The solution of pectin and water may be of various strengths. For example, a solution may be used of such strength that one gallon of the solution will contain enough pectin to jell 60 pounds of sugar. Such a solution would be termed a No. 60 grade pectin solution. The pectin solution may also contain some sugar, for example, 1 pound of sugar to each gallon to act as a dispersing agent, but the sugar may be omitted, if desired.

While I have recited in the above preferred modification of my process that the pectin solution is added before the seeding step, it will be understood that the order of these steps may be reversed.

The pectin solution may either be prepared from dry, solid, pectin with the aid of heat and mechanical agitation, or a commercial form of pectin solution may be used.

13 gallons of the No. 60 grade pectin solution so prepared are added to the solution of invert sugar obtained in the manner described above, while keeping the temperature of the sugar solution at about 170° F. The pectin solution is added slowly while stirring the mass. After complete solution is obtained, the mass is cooled to about 90° F. and 30 pounds of solid invert sugar, preferably in powdered form, are added. After the mass has been thoroughly mixed, it may be homogenized by passing the mass through a suitable form of homogenizer, but this is not essential.

As quickly as possible after the addition of the solid invert sugar, the mass, which is now a clear colorless liquid, is chilled to as low a temperature as practical. The exact temperature of the chilling is relatively unimportant, but I prefer to chill to a temperature slightly above or at the freezing point of water, since the desired result is obtained much more quickly when a low temperature is used and a whiter product is possible. The combined action of seeding the mass with solid invert sugar and of chilling it causes the mass to grain and set to a white cream of grease-like consistency.

Instead of using solid invert sugar, dextrose alone may be used with the same results. Similarly, instead of making up a solution of invert sugar, a commercial solution of corn syrup, comprising dextrose, dextrin, and, usually, maltose, may be employed. Syrups of this type are uncrystallizable even in high concentrations but when dextrose is added, the solutions are caused to grain upon chilling.

The final composition of my invention preferably contains little if any cane sugar but is composed largely of the monosacchardies, such as dextrose or levulose, or, where corn syrup is used, mainly of dextrose and dextrin. The use of these simple sugars makes it possible to readily obtain the desired creamy, or grease-like consistency. The pectin serves as a binder of a colloidal nature to stabilize the mass into a substantially permanently homogeneous whole with the very fine grains of sugar distributed uniformly throughout the mass.

A typical product of my invention has a total solids content of about 75 to 80%, the balance being water. The solids comprise the sugars and pectin. Obviously, it would be impossible to obtain a similar product of such a high concentration of sugar and pectin, if cane sugar only were used, since the cane sugar would crystallize out in large crystals or lumps. The simple sugar content of my product, therefore, is responsible for its desirable physical characteristics.

My product is very useful in the making of jellies, since it may be used by the housewife to replace part of the sugar and to eliminate the necessity of adding pectin separately. When making jellies from fruit syrups deficient in pectin or containing insufficient quantities of pectin, a sufficient quantity of my product may be added to supply the necessary amount of pectin for jellification. Since the pectin is in a readily soluble form, none of the difficulties usually attendant upon the use of dry pectin are experienced in the use of my product.

Where my product is to be used in making jellies, it is preferable to have more than sufficient pectin present so that the housewife need add no further quantities of pectin separately, but only sugar, acid and water, or fruit juice. However, for use in confectionery, the product may have less than sufficient pectin to actually jell all of the sugar with which it is associated. Thus the pectin content may vary widely between, say, 0.01 and 10 times, but preferably between 0.75 and 1.5 times the amount actually required to jell the associated quantity of sugar.

In the making of any jelly preparation, it is preferable to add my composition last, since it contains a large proportion of simple sugars and therefore will not tend to cause the cane sugar already in solution to crystallize out.

The food composition of my invention may further be used as an ingredient for the filling of chocolate cream candies, as a fondant. The aqueous or syrup content of my product, when once set, has little or no tendency to separate out and therefore does not cause leakage when used in candies. Further, the presence of invert sugar in such preparations prevents undue drying out of them.

This is a continuation in part of my copending application Serial No. 576,211, filed November 19, 1931.

I am aware that numerous changes may be made and that the details of my invention may be varied throughout a wide range without departing from the principles thereof and I therefore do not purpose limiting the patent granted hereon otherwise than necessitated by the prior art.

I claim as my invention:

1. A food composition comprising a stable mixture of monosaccharide, pectin and water, said mixture being of a creamy, grease-like consistency with fine sugar crystals uniformly distributed throughout the mixture.

2. A food composition comprising a substantially permanently homogeneous mixture of an initially difficultly crystallizable syrup of a monosaccharide, and pectin, the mixture being of a creamy, grease-like consistency and white in appearance.

3. A food composition comprising a relatively stable mixture of invert sugar and pectin in a slightly acid aqueous medium, the mixture being of a creamy, grease-like consistency and white in appearance.

4. A food composition comprising a mixture of invert sugar, pectin and water, the pectin being present in a quantity sufficient to jell all of the sugar content, said mixture being of a creamy, grease-like consistency and white in appearance.

5. A food composition comprising a substantially permanently homogeneous mixture of an initially difficultly crystallizable sugar syrup and pectin, the mixture being of a creamy, greasy consistency, with a portion of the sugar present in finely crystallized form distributed uniformly throughout the mass.

6. The process of making a pectin-sugar composition, which comprises dissolving pectin in difficultly crystallizable aqueous syrup of a monosaccharide, seeding said syrup with a solid sugar, agitating, and cooling to set the mass.

7. The process of making a pectin-sugar composition, which comprises forming a concentrated aqueous sugar syrup containing invert sugar and having a slightly acid reaction, adding a solution of pectin thereto, seeding the resulting solution with solid dextrose-containing material, agitating the mass and cooling the mass until set to a creamy, grease-like consistency.

8. The process of making a pectin-sugar composition, which comprises adding a solution of pectin to a concentrated slightly acid aqueous solution of invert sugar, thoroughly mixing the solutions to distribute the pectin uniformly, adding solid invert sugar to effect graining and cooling to set the mass to a creamy, grease-like consistency that is white in appearance.

ROBERT M. PRESTON.